Sept. 8, 1964 L. P. ZIMMERMAN ETAL 3,147,637
DATA STORAGE DEVICE
Filed March 5, 1963 3 Sheets-Sheet 1

INVENTORS
LOUIS P. ZIMMERMAN
ALBERT W. ZEMEK
BY Eidelman & Wolffe
ATTORNEY

Sept. 8, 1964 L. P. ZIMMERMAN ETAL 3,147,637

DATA STORAGE DEVICE

Filed March 5, 1963 3 Sheets-Sheet 2

INVENTOR

LOUIS P. ZIMMERMAN

ALBERT W. ZEMEK

BY Fidelman & Wolffe

ATTORNEY

Sept. 8, 1964 L. P. ZIMMERMAN ETAL 3,147,637

DATA STORAGE DEVICE

Filed March 5, 1963 3 Sheets-Sheet 3

INVENTOR

LOUIS P. ZIMMERMAN
ALBERT W. ZEMEK

BY Fidelman & Wolffe

ATTORNEY

United States Patent Office 3,147,637
Patented Sept. 8, 1964

3,147,637

DATA STORAGE DEVICE

Louis P. Zimmerman and Albert W. Zemek, Binghamton, N.Y., assignors to Universal Instruments Corporation, Binghamton, N.Y., a corporation of New York Filed Mar. 5, 1963, Ser. No. 262,978
7 Claims. (Cl. 74—568)

This invention relates to data storage apparatus in which a number of memory drums can be quickly and easily integrated, and more particularly to a mechanical memory drum for such a system composed of an assembly of simple stampings providing an inexpensive unit adapted to mass production.

Mechanical memory systems in use today are considerably less expensive than comparable electronic or hydraulic systems, although still not within the reach of all who would otherwise avail themselves of the advantages of automation. The most expensive single item of the mechanical systems is the memory drum, and, therefore, the industry has continually strived for methods of reducing manufacturing costs of this particular item.

Mechanical memory units are basically alike in their general design, each having a cylindrical drum with reciprocatable memory storage elements mounted either in the circumferential surface or the end faces of the drum. A detent means holds the memory storage elements in pre-selected positions during setting, reading and resetting operations. Both of the aforementioned drum designs are adaptable to a binary system in which only two storage positions are necessary. While this is acceptable in some instances, many of the controlled operations require a third "no test" or trinary storage position.

In a system in which the elements are mounted through the end faces of a drum, a binary or trinary system is possible by shifting the elements across the axial length of the drum with one or two reciprocatable actuators. Where trinary storage is desired the actuators are usually located on either side of the drum, opposite each other. A more expensive arrangement uses one actuator with a selective throw, driving the storage elements through the drum to different degrees. Since the opposed actuator design uses actuators that drive a reciprocatable storage element to the limit of its movement parallel to the drum axis, no special type need be designed and one of the common inexpensive actuators on the market may be used.

When there is a need to conserve axial space or to provide for a more self-contained memory storage unit comprising the memory drum, actuators, readers, and resetters, a peripheral drum is more acceptable. In these designs when a binary system is needed, the outstanding problem is the resetting of the storage elements. Since they are usually driven into the drum interior, the reset unit in this instance is generally located in a hollow central portion of the drum. If the elements are to be pulled out, rather than driven in by the actuator, the resetting mechanism may also be located on the periphery of the drum. However, the actuating mechanism now requires special hooking means to pull the storage elements outward, and the hooks must be carefully aligned to perform their function correctly. At present no successfully designed, competitively priced trinary peripheral system, actuated and reset from outside the drum has been developed due to the expense involved in fabrication with either a multiple throw or internal actuator.

The usual method of manufacture of both the peripheral and axial memory units comprises casting each memory drum as a single unit after which storage elements containing passages are drilled or cut in at least one surface of the drum. The individual memory storage elements are then inserted into the drum and locked in place so that they may be shifted without falling out. Although the stamping of parts is one of the least expensive manufacturing processes adaptable to mass production, no memory drum design to date has taken advantage of this technique by providing simple stamped components which may be assembled to form the composite drum. By this assembling technique a further saving can be effected by providing that all the storage elements be interconnected and assembled within the composite memory unit to provide a complete structure, not requiring separate locking members for each and every storage element.

The saleability of any memory unit is largely predicated on the versatility of its of its design. To obtain versatility, it is desirable that the memory units be modular in construction so that individual ones may be added or subtracted from a bank of units, or an individual unit may be replaced if it malfunctions, in the space of a few minutes to accommodate a short run of an assembly line. Removal of one or more modules should not mechanically affect the rest of the bank in any way. Of special importance is the ability of a designed memory bank to be operated in parallel for multiple parameter data storage and sorting, or serially to obtain increased shift capacity.

Therefore, it is an object of the invention to provide an inexpensive memory drum device adapable to fabrication by the assembly of simple stamped components.

Another object of the invention is to provide a trinary memory drum with the storage function carried out by standard solenoid actuators.

A further object of the invention is to provide a trinary drum assembly on which the storage elements are rotatably journalled in the periphery of the drum to provide a compact unit.

A still further object of the invention is to provide a trinary memory drum assembly in which the actuators, readers, and reset units lay outside the confines of the drum itself, although forming a compact unit therewith.

Another object of the invention is to provide a memory drum bank in which the individual memory units are interchangeable, and extra units may be added or removed easily without mechanically affecting those in operation.

Other objects and advantages of the invention will be apparent from the accompanying drawings and description.

Figure 1:
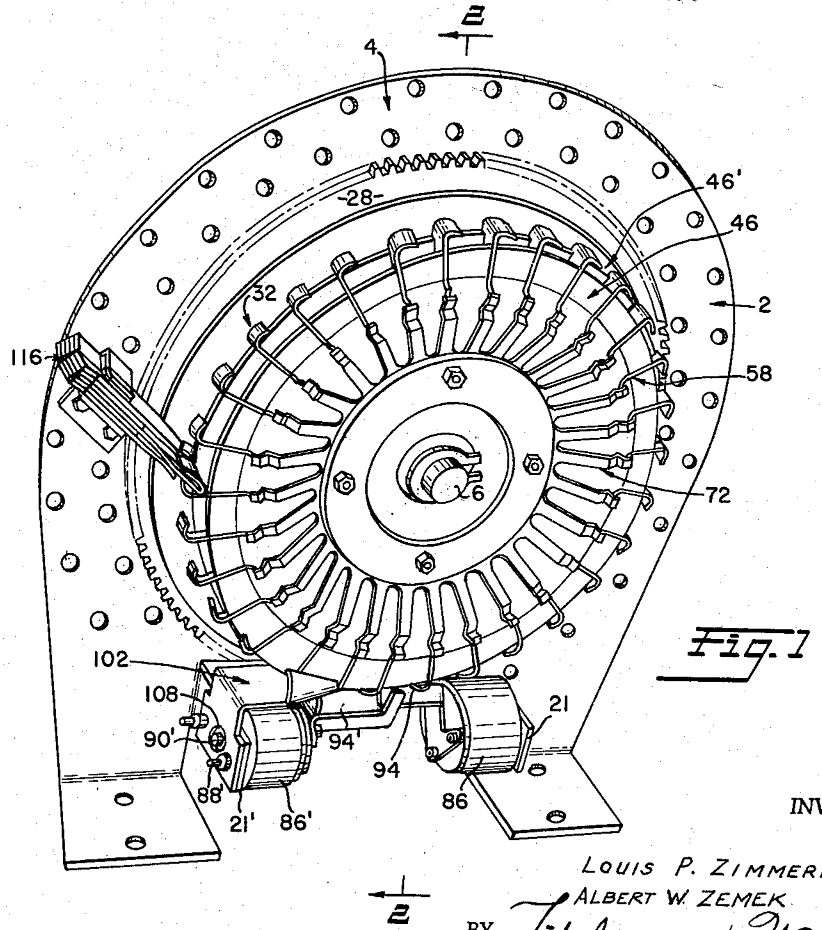
FIGURE 1 is a perspective view of a memory drum assembly including the actuators, a reader unit, and a reset unit.

A memory drum assembly, generally designated 2, and incorporating the novel features of the present invention (as shown in section in FIG. 2 and in an exploded view in FIG. 3) comprises in part, a composite memory drum, generally designated 14, which is rotatably journalled on a main mounting bracket, generally designated 4. Also mounted on the main mounting bracket 4, adjacent the composite memory drum 14, are a pair of opposed solenoid actuators 86 and 86′, a reader switch 116 and a reset unit 102 (FIG. 1). A shaft 6, grooved at 10, is secured to a face of the main mounting bracket 4, by a screw 12, for journalling the composite memory drum 14, a drive gear 28 and an intermediate mounting plate 32.

The main mounting bracket 4 has a pair of vertical legs 16, extending from the lower edge thereof, said legs having horizontal feet 18 with holes 20 for mounting the memory drum assembly 2 to a base. A pair of opposed vertical ears 21 and 21′ extend perpendicularly to, and outward of, the same face of the main mounting bracket 4 as the horizontal feet extend and the shaft 6 is secured. Ear 21 contains a central aperture 22 and a pair of mounting holes 24, while the ear 21′ contains a central aperture 22′ and a pair of mounting holes 24′. A large number of mounting holes 26 are formed in the surface of the main mounting bracket 4 for a purpose that will be discussed later.

The composite memory drum 14 is composed of a plurality of stampings including circular separator plate 42, with inwardly extending equally spaced radial slots 56, journalled on the mounting shaft 6 by means of a bearing 44, press-fitted therein, and extending outwardly of both sides of the separator plate 42. On the outer side of the storage separator plate 42 (the side farthest from the main mounting bracket 4) and in face to face relationship therewith, is a circular storage plate, generally designated 46, which comprises; a planar circular center section 47 with a coaxially aligned central aperture 49 for fixedly encircling the outwardly extending bearing 44 of separator plate 42, a circumferential rim 48 extending radially and axially outwardly of the circumference of the center section 47 in a direction away from the plate separator 42, and a continuous circular terminal flange 50 parallel to the storage plate body section 47 and extending from the outer edge of the rim 48.

A series of substantially radial slots 52 are equally spaced around the storage plate 46 and extend outwardly from the circumference of the body section 47, through the outwardly extending portion 48 and flange 50 to the periphery of the storage plate 46 to form stiff fingers or sections 54. An identical storage plate 46′ is mounted in face to face relationship with the storage plate separator 42 on the inner side thereof. The storage plate 46′ also has a body section 47′, an outwardly extending rim 48′, and a series of equally spaced slots 52′ extending outwardly from the circumference of the body section 47′, and through the rim 48′ and flange portion 50′ to form fingers 54′. Pairs of slots 52 and 52′ in storage plates 46 and 46′, respectively, are in line with each slot 56 in the plate separator 42 to form a substantially continuous slot through the periphery of the composite memory drum 14.

Figure 2:
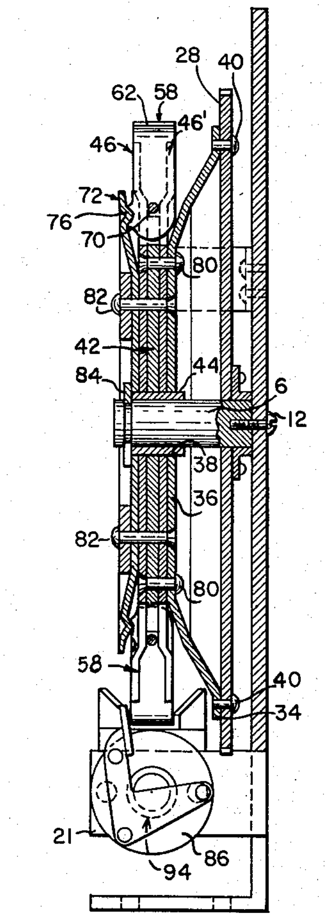
FIGURE 2 is a sectional view taken along line 2—2 of FIGURE 1.
Figure 4:
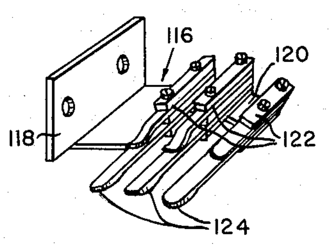
FIGURE 4 is a perspective view of the reader mechanism.
Figure 5:
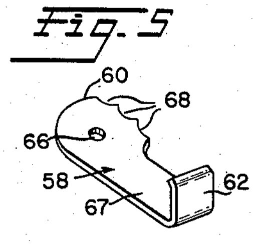
FIGURE 5 is a perspective view of a single storage bit.
Figure 6:
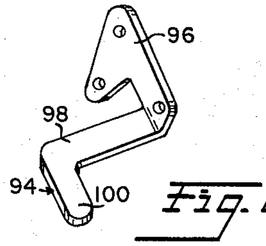
FIGURE 6 is a perspective view of a bit setter.
Figure 3:
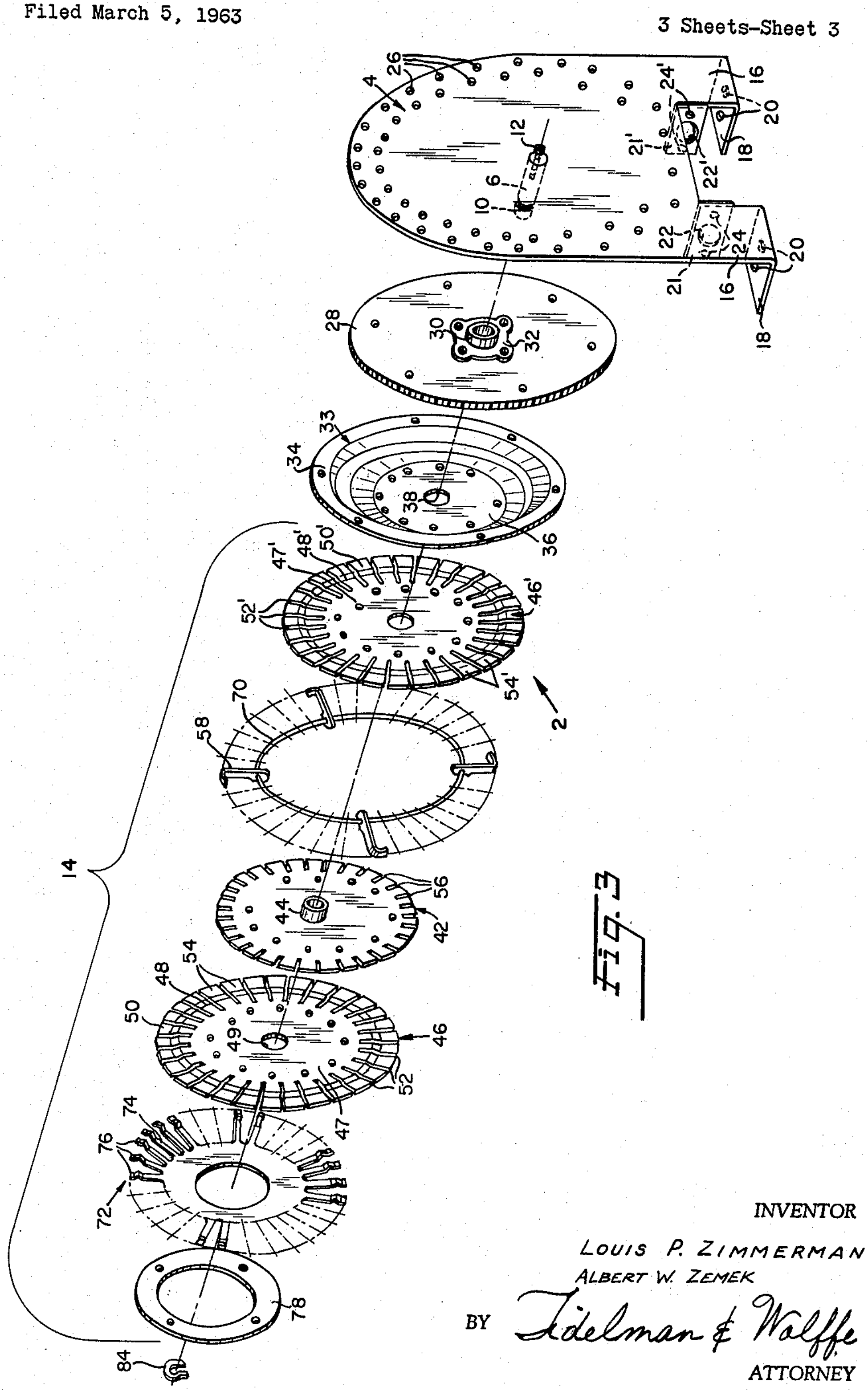
FIGURE 3 is an exploded view of the memory drum unit shown in FIGURE 1.

A plurality of storage bits 58 (FIG. 5) which are fabricated of sheet metal, each comprising a circular lower portion 60, with a concentric aperture 66 and an upper neck portion 67 terminating in a perpendicular tab 62, are mounted in the composite memory drum 14 by a continuous ring 70 passing through the apertures 66 in the lower circular portion 60 of the storage bits 58 and just fitting over the circular periphery of the storage plate separator 42 while being held against lateral movement by the adjacent plates 46 and 46′. Each storage bit is thereby pivotally held in the composite of aligned slots 52, 56, 52′ with the upper neck portion 67 extending beyond the periphery of the storage plates 46 and 46′ whereby the storage bit tabs 62 lie across a hollow area defined by the adjacent pair of storage plates 46 and 46′ when the bit is in a radially extending central position (FIG. 2). The circular lower portion 60 of each storage bit 58 contains a series of three recesses 68 along its circumference. At least one recess 68 extends beyond the outer side of the storage plate 46 (as shown in FIG. 2).

Mounted outwardly of, and concentric with, the storage plate 46 is a circular storage spring 72 containing inwardly bent spring fingers 74. A spring retaining ring 78 is mounted outwardly of the storage spring 72 and clamps the storage spring 72 to the storage plate 46 to provide tension in the spring fingers 74. Each finger 74 overlies a composite slot 52, 56 and 52′ and has a crimped end portion 76 which abuts the extending circular portion 60 of the adjacent storage bit 58 at the same distance from the center of shaft 6 as the axis of the storage ring 70. The crimped portion 76 of spring finger 74 coacts with one of the three recesses 68 in the circular portion 60 of storage bit 58 to hold the storage bit 58 in one of three possible positions. In the center position, the spring finger 74 coacts with the middle recess 68 for holding the storage bit 58 radially upright with the bent portion 62 thereof totally within the confines of the storage plates 46 and 46′. When the spring finger 74 coacts with the lower or upper recess 68, the bit 58 is tilted clockwise or counterclockwise respectively (based on upper bit 58 in FIG. 2) with the bent portion 62 lying outside of the storage plates 46 or 46′.

Mounted between the composite drum 14 and the main mounting bracket 4 is the drive gear 28. This gear is journalled on the shaft 6 by a concentric bearing sleeve 30 which is riveted to the drive gear 28 through a flange 32, said bearing sleeve serving also as a spacer between the gear 28 and bracket 4. A circular intermediate mounting plate, generally designated 33, is concentrically mounted on the drive gear 28 by means of rivets 40 through a circular parallel flange section 34 extending circumferentially around the outside of the mounting plate 33. Outwardly axially offset from the flange 34, and parallel thereto, the mounting plate 33 has a central planar section 36 with a central aperture 38. The central planar section 36 is connected to storage plate 46′, the separator plate 42 and the storage plate 46 to form a composite assembly by rivets 80 extending therethrough in a circular pattern. The bearing 44 in the separator plate 42 extends through the entire composite memory drum 14 and the mounting plate aperture 38 to journal the assembly on shaft 6. The storage spring 72 is clamped in the composite memory drum 14 by the retaining ring 78 and a circular pattern of rivets 82 extending therethrough. A spring clip 84 locks onto the shaft 6 at groove 10 to hold the assembled composite memory drum against axial movement.

Figure 7:
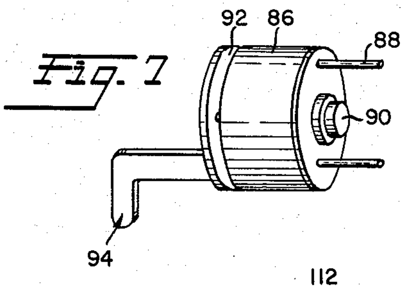
FIGURE 7 is a perspective view of one of the rotary solenoid actuators of the memory unit with a bit setter attached thereto.

Peripherally of the memory drum 14 a rotary solenoid 86 (of the cam-action type, well known in the art) is located, being mounted on the inner side of bracket ear 21 by means of integral mounting bolts 88 extending from the one end of the rotary solenoid 86 through mounting holes 24 in ear 21. A rotatable shaft 90 (FIG. 7) extending through the solenoid 86, resides in the central hole 22 in the ear 21 while circular cam plate 92, fixed to the rotatable shaft 90, at the other end of the solenoid, mounts a bit setter, generally designated 94. The bit setter 94 comprises a planar mounting section 96 and an L-shaped bit setting portion 98 formed at 90° thereto and having a short leg 100 for abutting the bent portion 62 of a storage bit 58 upon actuation of the solenoid 86.

The other bracket ear 21' mounts a second solenoid 86' in a similar fashion with the mounting bolts 88' on the solenoid 86' extending through the mounting holes 24' in the ear 21' with the rotatable shaft 90' extending through the central hole 22'. This solenoid 86' also has a bit setter 94' similar to bit setter 94.

Figure 8:
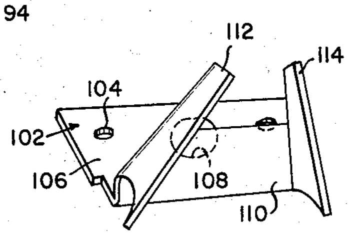
FIGURE 8 is a perspective view of the reset unit.

Also mounted peripherally of the memory drum 14 is the reset unit, generally designated 102 (FIG. 8) which is held to the outer face of the bracket ear 21' by means of mounting bolts 88' extending through the ear 21' and located in holes 104 in the planar mounting face 106 of the reset unit 102. A central hole 108 in the planar mounting face 106 of the reset unit 102 provides clearance for the end of rotatable shaft 90' of the solenoid 86'. A bridging section 110 of the reset unit extends inwardly from and perpendicular to the planar mounting face 106, over the mounting ear 21' and solenoid 86', centrally located under the storage plates 46 and 46', respectively. A pair of cam plates 112 and 114 extend vertically upward from sides of the bridging section 110, straddling the composite memory drum 14. The cam plates 112 and 114, each forming an identical angle with the face of the adjacent storage plate 46 and 46', extend adjacent to the tabs 62 of the storage bits 58, and at the widest point between the cam plates 112 and 114 are out of contact with the bits in any of their three possible positions, while at the narrowest point between the plates, allowing the storage bits 58 to be only in the central position.

The reader switch generally designated 116 is mounted on the mounting bracket 4 adjacent the circumference of the rotatable composite memory drum 14 and situated to read the bit position of a storage bit 58 after it has passed the bit setting solenoid units 86 and 86' and before the same bit 58 reaches the reset unit 102, as the composite memory drum 14 rotates counter-clockwise (FIG. 1). The reader switch 116 is composed of a planar mounting face 118 and a bent switch holding section 120 for mounting the three electrical switches 122 in the path of the storage bits 58, one in each possible position of a storage bit 58. The contacting end 124 of one switch 122 will be in actual interference relationship with the bent end portion 62 of a bit 58 as the storage bit passes the reader switch 116 to actuate the same and cause an electrical signal through the switch 122 as the switch closes upon contact with the bit.

During the operation of the memory drum assembly when the drive gear 28 is rotated, discrete signals are sent to rotary solenoids 86 and 86'. These signals cause the particular solenoid, for example 86, to be activated, rotating the circular cam plate 92 and therefore, also rotating the associated bit setter 94. The short leg 100 of the bit setter 94 will be moved into contact with the bent end portion 62 of the particular storage bit 58 residing in its central position. The force of this contact drives the bit 58 counterclockwise, as seen in FIG. 2. Meanwhile, the crimped end portion 76 of the adjacent spring finger 74 is forced out of the central recess 68 and drops out of the upper recess to hold the storage bit 58 in its rotated position with its bent portion 62 lying outside the drum 14. As the composite drum 14 is driven, the rotated bit 58 eventually comes under the reader switch 116. The bent end portion 62 of the storage bit 58 contacts the contacting end 124 of the innermost electrical switch 122 resulting in the sending of a signal to a mechanism to be controlled (not shown). Continued travel of the composite drum 14 carries the bit 58 between the cam plates 112 and 114 of the stationary reset unit 102 with the particular bit 58 traveling in a direction from the widest portion through the narrowest portion between the cam plates 112 and 114. Plate 114 cams the bent portion 62 of the storage bit 58 clockwise, until the bent portion 62 is within the storage plates 46 and 46' and the crimped end portion 76 of the spring finger 74 again is biased into the central groove 68 of the upright bit 58. The bit 58 is, at this point, prepared to accept another actuation from the bit setters 94 or 94' to rotate it clockwise or counterclockwise, respectively. Depending on the usage intended, a particular bit 58 may not be rotated by the bit setters 94 or 94' and may be left in the central position for a third reading or no reading at all.

Figure 9:
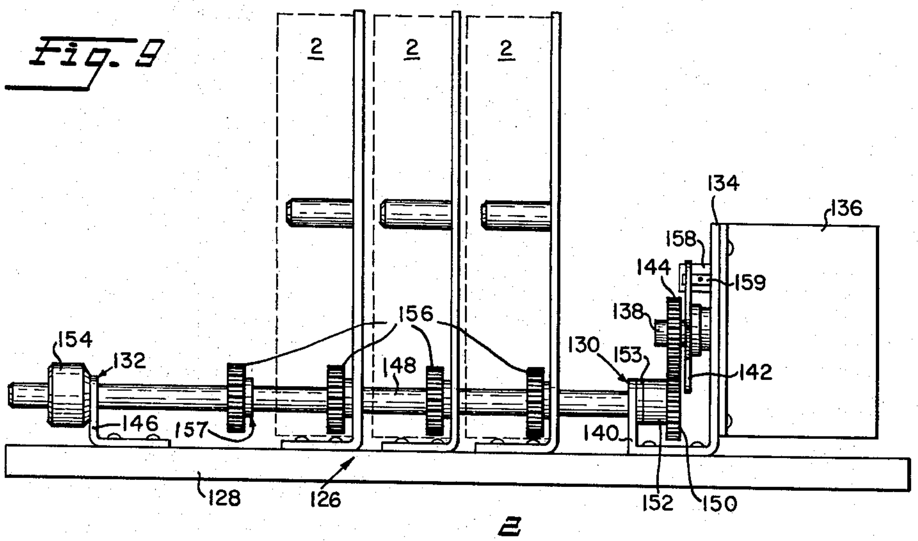
FIGURE 9 is a side plan view of a shift register adapted to drive one or more of the memory units.
Figure 10:
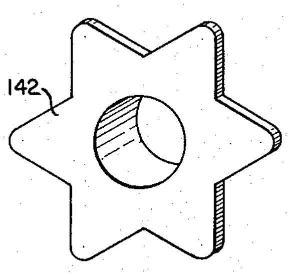
FIGURE 10 is a perspective view of the motor controlling cam wheel, for the shift register shown in FIGURE 9.

FIGURE 9 shows, partially in phantom, a series of memory drum assemblies, 2, integrated into a shift register, generally designated 126, adaptable to receive a plurality of memory drum assemblies, depending on the particular operational requirements. The shift register 126 has a base plate 128 with opposed mounting brackets, generally designated 130 and 132, attached at either end thereof. Bracket 130 is U-shaped and is mounted in an upright position with an outer, longer leg 134 supporting an electric motor 136 on its outer face. The electric motor 136 has a rotatable shaft 138 extending therefrom through the longer leg 134 and toward the shorter leg 140 of bracket 130. A cam 142 in the shape of a six-sided star (FIG. 10) and a keyed pinion 144, beyond the cam 142, fixedly are mounted on the motor shaft 138. The bracket 132 is L-shaped with an upstanding leg 146 which is parallel to the legs of the U-shaped bracket 130. A drive shaft 148 is journalled in aligned holes in the legs 140 and 146 and is driven by a keyed pinion 150 located between the legs 134 and 140 of the U-shaped bracket 130. The pinion 150 meshes with pinion 144 on the motor shaft 138 of the rotary electric motor. The pinion 150 also has a boss 152 abutting a thrust washer 153 adjacent the shorter bracket leg 140 to axially position the drive shaft 148. A stop member 154, fixed to the drive shaft 148 adjacent the outer face of the leg 146 of bracket 132, positions the drive shaft 148 in the other axial direction. A series of spur gears 156 are spaced equidistant from each other along the drive shaft 148, between the brackets 130 and 132, and each is adapted to mesh with a drive gear 28 of a memory drum assembly 2, bolted to the base plate 126, adjacent to its respective gear 156. Each spur gear 156 has a hollow stub axle shaft 157 for fixedly mounting the gear on the drive shaft 148. Due to this arrangement a memory drum assembly may be mounted to the shift register by merely bolting the feet 18 of the bracket 4 to the base plate 128 through the mounting holes 20 in the feet (FIG. 3) without disturbing the other operating assemblies 2 or removing the drive shaft 148. A micro-switch 158 supported by the bracket leg 134 has blade switch contact 159 actuatable by cam 142 to stop the rotary motor after each signal sent by the reader switch 116.

The memory drum assemblies each have thirty sets of slots 52, 56, 52' and thirty storage bits 58, one for each slot. This necessitates thirty reading stations or stopping points for each rotation of the drum. Since there are only six lobes on the cam 142 the gear ratio between the pinion 156 and the drive gears 28 must be five to one to have proper sequential operation. The switch 158 in this instance, acts to shut off the electric motor 136 after a new reading station is reached. A reset or starting button (not shown) must be actuated to start the motor again. The switch 158 may, in other applications, be used to momentarily stop the drum during a continuous operation, or may be disconnected completely allowing the memory drum to rotate at constant speed.

Because of the placement of the reset unit and the solenoids the capacity of the memory unit shown is actually 24 readings per drum while the shift rate would allow a possible 10,000 settings an hour depending on the test time and whether the actuation is manual or automatic.

The number of permutations obtainable with this system when more than one memory unit is connected for actuation by a particular source, goes up quite rapidly, as shown below:

| Number of Units | Categories | |
|---|---|---|
| | Binary | Trinary |
| 2 | 4 | 9 |
| 3 | 8 | 27 |
| 4 | 16 | 81 |

This memory unit to be used in logic systems as an automatic binary or trinary: shift register, memory, multiplexer, sorter, or numerical controllers, or as an addressable, scanner or predetermined counter or tester. As a testing "go—no go" device the central position can be used to indicate "no test" or as an error signal.

The individual components of this memory unit assembly have been designed with stamping procedures in mind. For example, the main mounting bracket, the separator plate, storage plates, spring plates, as well as the storage bits can be stamped out of sheet material. Even the memory drum drive gear may be stamped out if a thin gear is acceptable in a particular installation since the tolerances usually permitted on heavy stamping equipment are well within the limits acceptable for any part of the assembly and consistent with reliable operation in the mahcine. This design permits the use of assembly line mass-production equipment and procedudes while allowing the manufacturer to sub-contract any parts of the memory drum assembly if his plant is not of a size commensurate with the number of units contemplated.

While we have shown and described a preferred embodiment of our invention, other modifications thereof will readily occur to those skilled in the art, and we, therefore, intend our invention to be limited only by the appended claims.

What we claim is:

1. A memory drum assembly comprising, a composite memory drum composed of; a circular separator plate having first and second planar faces, said separator plate being rotatably journalled on a shaft fixed on a main mounting bracket, coaxial circular first and second storage plates fixed to the first and second faces, respectively, of the separator plate, said first and second storage plates having equal diameters with said diameters of said storage plates being substantially greater than that of the separator plate, a series of equally spaced group of parallel radial slots through the separator plate and the storage plates extending to the circumference of said storage and separator plates, a continuous ring extending around the circumference of the separator plate within the space between the adjacent storage plates, said ring journaling a plurality of storage bits, each of said separator bits residing in one of the group of slots through the separator plate and the adjacent storage plates.

2. A memory drum assembly according to claim 1 wherein each storage bit has three consecutive recesses in a portion extending outwardly of an outer face of the first storage plate, a plate spring clamped to the outer face of the first storage plate, said plate spring having a plurality of spring fingers, each finger extending over one of the slots in the outer face of the first storage plate and in contact with one of the recesses in said storage bit extending outwardly of the slot whereby the storage bit is held in one of three pre-selected positions determined by the recess in contact with the spring finger.

3. A memory drum assembly according to claim 2 wherein said composite memory drum is affixed to a drive gear, a main mounting bracket, a horizontal shaft fixed to a vertical body of the bracket and journalling the memory drum and the drive gear.

4. A memory drum assembly according to claim 3 wherein a pair of opposed ears are mounted perpendicular to the face of the main mounting bracket adjacent the composite memory drum, a rotary solenoid mounted on each of said ears, a bit setting means affixed to each of said solenoids whereby actuation of a solenoid would rotate the associated bit setting means into contact with an adjacent storage bit in order to shift the bit from a central position to a rotated position.

5. A memory drum according to claim 4 wherein the main mounting bracket has a pair of lower vertical legs extending therefrom, the lower edge of the body portion of the main mounting bracket being above the lower edge of the drive gear so that the memory drum assembly may be placed over a drive shaft without assembly difficulties.

6. A shift register comprising a horizontal base having a planar mounting surface, a horizontal drive shaft journalled on said base by mounting means with an axis parallel to the mounting surface, a drive motor mounted on said base and drivingly connected to said drive shaft, a plurality of gears fixedly mounted equidistant along said drive shaft, at least one memory drum assembly as recited in claim 7 removably mounted on said base by said main mounting bracket adjacent one of said gears by the main mounting bracket adjacent to one of said gears, a drive ring gear fixed to the periphery of the memory drum and meshing with the adjacent gear on said drive shaft to drive the memory drum, a cut out lower central part of the main mounting bracket extending from above the lower edge of said drive gear to the base of the bracket whereby a drum assembly may be mounted on the shift register without any assembling or disassembling besides fastening the main mounting bracket to said base.

7. A memory drum assembly consisting of a substantially cylindrical mechanical memory drum rotatably journalled on a main mounting bracket, drive means operatively connected to said drum for rotating said drum in one direction of rotation, said drum having a plurality of radial slots extending through the periphery thereof and equidistantly spaced around the circumference of the drum, a pivotable memory storage bit journalled in each slot in said drum, a first portion of each bit extending beyond the circumference of the drum, a second portion of each of said bits extending beyond one side wall of the cylindrical memory drum, the second portion of each storage bit having a series of three consecutive recesses on the edge thereof, a spring plate mounted on said side wall of said memory drum and having a finger means in one of said recesses on the second portion of each of said storage bits, the series of three recesses being placed on the edge of the second portion of a storage bit so that the first portion of a storage bit lies substantially within the side walls of the memory drum when the spring finger is in the central one of the three recesses thereof and said first portion lies outside the side walls of the memory drum when the spring finger lies in either of the other two recesses, an automatic bit setting station mounted on the main mounting bracket for setting a preselected storage bit in one of the three preselected positions, as the drum rotates said preselected bit to a position adjacent said bit setting station, the bit setting station consisting of a first and second bit setter, said first setter adapted to coact with the first portion of a preselected storage bit to move said bit from a position with the spring finger held within said central recess in the second portion of the storage bit to a position with the spring finger held within the first recess of the three consecutive recesses in the edge of the bit, said second bit setter adapted to coact with the first portion of said preselected storage bit to move said bit from a position with the spring finger held within said central recess in the second portion of the storage bit to a position with the spring finger held with the third of the three consecutive recesses in the edge of the bit, an automatic bit reading station mounted on said mounting bracket in a position adjacent the drum after the setting means in the direction of rotation of said drum, said reading means adapted to sense the preselected positions of a bit as the drum rotates carrying the preselected bit past the reading station and emit a distinct signal corresponding to the one of the three positions sensed, a stationary automatic bit resetting station mounted on the main mounting bracket adjacent the drum after the reading station and before the bit setting station in the direction of rotation of said drum and adapted to cam each of the bits into the central preselected position as the bit passes the resetting means during rotation of said drum.

References Cited in the file of this patent

UNITED STATES PATENTS

| | | |
|---|---|---|
| 1,006,938 | Harris | Oct. 24, 1911 |
| 2,020,877 | Coolidge | Nov. 12, 1935 |
| 2,695,342 | Junghans et al. | Nov. 23, 1954 |
| 2,770,975 | Galley | Nov. 20, 1956 |
| 2,772,579 | Jeffery | Dec. 4, 1956 |

FOREIGN PATENTS

| | | |
|---|---|---|
| 17,798 | Netherlands | Mar. 15, 1928 |
| 667,344 | Great Britain | Feb. 27, 1952 |